(12) United States Patent
Boctor et al.

(10) Patent No.: US 7,865,441 B2
(45) Date of Patent: Jan. 4, 2011

(54) SWITCHING BETWEEN MULTIPLE VERSIONS OF A SOFTWARE PROGRAM

(75) Inventors: Emad Boctor, Toronto (CA); Andrew W. Hilden, Oshawa (CA); Lui Tang, Markham (CA)

(73) Assignee: International Business Machines Corporation, Armonk, NY (US)

( * ) Notice: Subject to any disclaimer, the term of this patent is extended or adjusted under 35 U.S.C. 154(b) by 1175 days.

(21) Appl. No.: 11/365,337

(22) Filed: Mar. 1, 2006

(65) Prior Publication Data

US 2007/0208667 A1 Sep. 6, 2007

(51) Int. Cl.
G06Q 99/00 (2006.01)
G06F 12/00 (2006.01)
G06F 15/00 (2006.01)

(52) U.S. Cl. .................................. 705/57; 717/170
(58) Field of Classification Search ................. 705/57; 717/120
See application file for complete search history.

(56) References Cited

U.S. PATENT DOCUMENTS

| 5,598,276 A | * | 1/1997 | Cookson et al. ............... 386/46 |
| 6,349,311 B1 | * | 2/2002 | Sobel et al. .................. 707/203 |
| 6,418,555 B2 | * | 7/2002 | Mohammed ................. 717/169 |
| 6,584,476 B1 | * | 6/2003 | Chatterjee et al. ............ 707/203 |
| 6,598,059 B1 | * | 7/2003 | Vasudevan et al. ........... 707/203 |
| 7,162,724 B2 | * | 1/2007 | Blaser et al. ................. 719/328 |
| 7,171,618 B2 | * | 1/2007 | Harrington et al. ........... 715/229 |
| 7,284,235 B2 | * | 10/2007 | Nachmanson et al. ........ 717/117 |
| 7,512,977 B2 | * | 3/2009 | Cook et al. .................... 726/22 |
| 2004/0168153 A1 | * | 8/2004 | Marvin ........................ 717/120 |

* cited by examiner

*Primary Examiner*—Evens J Augustin
(74) *Attorney, Agent, or Firm*—Stephen J. Walder, Jr.; Terrence J. Carroll

(57) ABSTRACT

A mechanism for switching between multiple copies of a software program on a computer system is provided. The mechanism includes detecting a plurality of copies of the software program on a computer system, receiving input selecting one of the detected plurality of copies of the software program to be a default copy, and determining whether the selected copy of the software program is a current default copy on the computer system. If the selected copy of the software program is not the current default copy on the computer system then, the mechanism further includes demoting the current default copy to be an alternate copy, and promoting the selected copy of the software program to be a next current default copy.

13 Claims, 4 Drawing Sheets

SWITCHING BETWEEN MULTIPLE VERSIONS OF A SOFTWARE PROGRAM

FIELD OF THE INVENTION

The present invention relates generally to data processing, and more particularly to methods for switching between multiple copies (e.g., versions) of a software program.

BACKGROUND OF THE INVENTION

Software programs typically must evolve to meet the changing needs of users. Accordingly, software developers generally continuously develop new versions of a given software program, for example, to add more features to a current version of the software program. Usually, there is only a single version of a software program on a computer system that users (and other software programs) interact with at any given time. If, however, more than one version or copy (two terms used interchangeably hereinafter) of a software program exists on the computer system, then users (and other computer programs) will need to know how to select which copy of the software program to interact with, and the users may have to, for example, change a particular software program to use a different driver other than a default driver. Such use of multiple versions of the same software program on a computer system adds quite a degree of complexity to using the multiple versions, as well as developing other software programs that may use the software program having multiple versions.

Accordingly, what is needed is an improved technique for users (or computer programs) to switch between multiple versions of a given software program. The present invention addresses such a need.

SUMMARY OF THE INVENTION

In one illustrative embodiment, a method for switching between multiple copies of a software program on a computer system is provided. The method comprises detecting a plurality of copies of the software program on a computer system and receiving input selecting one of the detected plurality of copies of the software program to be a default copy on the computer system. Each copy of the software program in the plurality of copies of the software program is a different version of a same software program. Each of the plurality of copies of the software program is registered with a registry of the computer system such that at one time each of the copies of the software program is separately identified in the registry of the computer system.

In another illustrative embodiment, a computer program product, comprising a computer-readable medium including instructions, for switching between multiple copies of a software program on a computer system is provided. The instructions, when executed on a programmable processor, cause the programmable processor to perform the operations outlined above with regard to the method illustrative embodiment.

In still another illustrative embodiment, a system for switching between multiple copies of a software program on a computer system is provided. The system comprises a global switcher to detect a plurality of copies of the software program on a computer system, receive input selecting one of the detected plurality of copies of the software program to he a default copy, and determine whether the selected copy of the software program is a current default copy on the computer system. If the selected copy of the software program is not the current default copy on the computer system, then the system further comprises a first local switcher to demote the current default copy to be an alternate copy, the first local switcher being associated with the current default copy, and a second local switcher to promote the selected copy of the software program to he a next current default copy, the second local switcher being associated with the selected copy of the software program. Each copy of the software program in the plurality of copies of the software program is a different version of a same software program. Each of the plurality of copies of the software program are registered with a registry of the computer system such that at one time each of the copies of the software program is separately identified in the registry of the computer system.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF THE INVENTION

Implementations of the present invention relates generally to data processing, and more particularly to methods for switching between multiple copies (e.g., versions) of a software program. The following description is presented to enable one of ordinary skill in the art to make and use the invention and is provided in the context of a patent application and its requirements. Various modifications to implementations and the generic principles and features described herein will be readily apparent to those skilled in the art. Thus, the present invention is not intended to be limited to the implementations shown but is to be accorded the widest scope consistent with the principles and features described herein.

Figure 1:
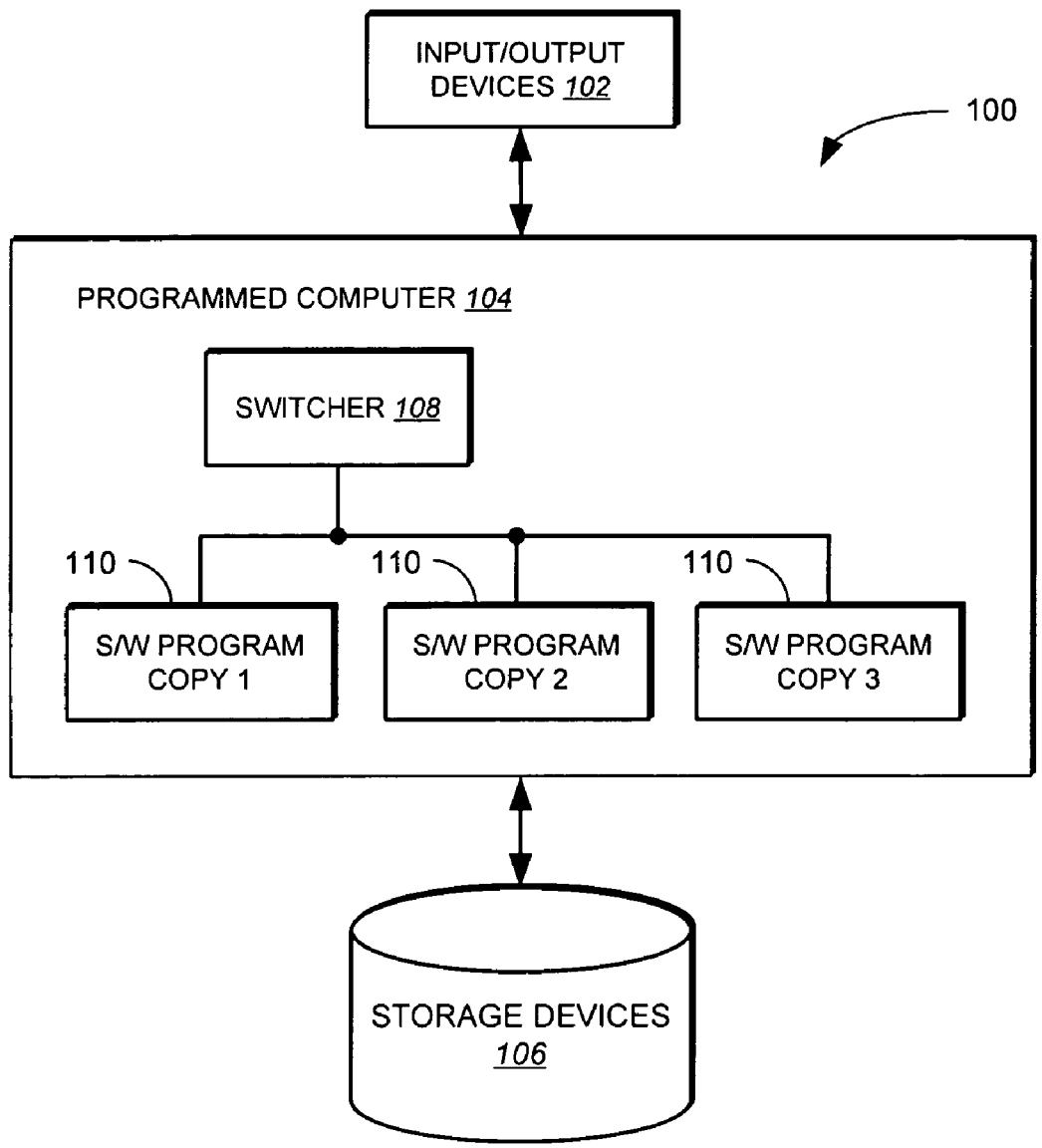
FIG. 1 is a block diagram of a system for switching between multiple versions of software program in accordance with one implementation of the invention.

FIG. 1 illustrates a system 100 for switching between multiple copies (e.g., versions) of software program in accordance with one implementation of the invention. The system 100 includes input and output devices 102, a programmed computer 104, and storage devices 106. The input and output devices 102 can include devices such as a printer, a keyboard, a mouse, a digitizing pen, a display, a printer, and the like. The programmed computer 104 can be any type of computer system, including for example, a workstation, a desktop computer, a laptop computer, a personal digital assistant (PDA), a cell phone, a network, and so on. Running on the programmed computer 104 is a switcher 108 and a software program 110. The switcher 108 is operable to switch between multiple copies (e.g., versions 1-3) of the software program 110 for interaction with a user or other computer programs. Although three copies of the software program are shown in FIG. 1 by way of example, a different number of copies of the software program 110 may operate on the programmed computer 104.

In one implementation, each of the multiple copies of a given software program share the same executable name—i.e., a name that activates the given software program. In one implementation, the switcher 108 permits a user to select a default copy from multiple copies of a software program through a user interface, as discussed in greater detail below. Alternatively, a default copy of a software program can be selected from an executing software program rather than a user. In one implementation, only one version of the software application 110 is in use (or operating) at any given point in time, and the other copies are, for example, hidden from the user.

In general, a version of a software program represents a particular edition, instance, or release of the software program. A new version of a software program usually has significant new code or functions compared to a previous version and, accordingly, file sizes and date stamps associated with multiple versions of a software program my be different. Also, multiple versions of the same software program my have different and/or extra features. For example, one version may have fixes for bugs found in previous versions. Each version of a software program typically has a unique version number associated therewith.

Figure 2:
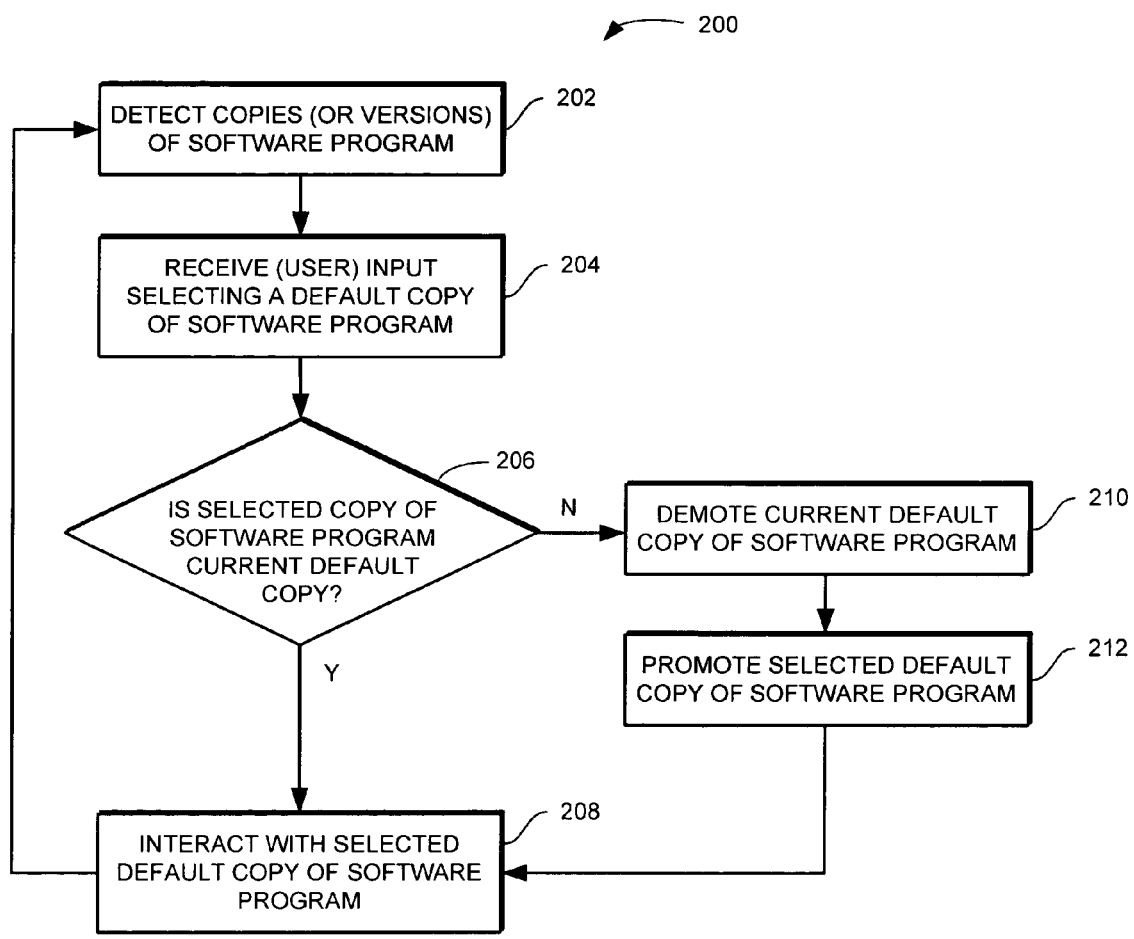
FIG. 2 illustrates a method for switching between multiple versions of a software program in accordance with one implementation of the invention.

FIG. 2 illustrates a method 200 for switching between multiple copies (e.g., versions) of software program in accordance with one implementation of the invention. The method 200 can be performed by the programmed computer 104 during execution of the switcher 108. Although the steps below are discussed separately, one or more of the steps can be grouped together and performed in a single transaction.

Multiple copies (or versions) of a software program is detected (e.g., by switcher 108) (step 202). In one implementation, the multiple copies of a given software program are detected by looking up the number of versions of the software program that are registered within a Windows registry. Other conventional techniques can also be used for detecting multiple copies of a software program in a Windows environment or in environments other than a Windows environment—e.g., a UNIX environment. For example, in a UNIX environment, multiple versions of a software program can be detected by examining a text file (registry) that maintains a listing of names, passwords, and/or other characteristics associated with each software version in the text file. User input selecting a default copy of the software program is received (step 304). The user input selecting the default copy can be received through a user interface. In one implementation, the selection of a default copy (of the software program) is received from another software program. In one implementation, the selected default copy of the software program operates as if that copy were the only copy on the programmed computer when interacting with a user or another computer program. A determination is made whether the selected copy of the software program is the current default copy (step 208). If the selected copy of the software program is the current default copy, then the user (or the another computer program) interacts with the selected software program as the default copy (step 208).

If the selected copy of the software program is not the current default copy, then the current default copy of the software program is demoted (step 210). Demoting a current default copy of a software program refers to the process of converting (or relegating) the current default copy to be an alternate copy. In one implementation, the switcher 108 demotes the current default copy of the software program by determining all the features of the current default copy, and ensures that each feature no longer exhibits a default interface on the computer system so that the copy no longer appears as the default copy (or is invisible) on the computer system. Example features include a desktop icon (e.g.) for the current default copy, a running (NT) system service, a registered database connectivity driver (or other driver), and so on. The selected copy of the software program is then promoted (step 212). Promoting a copy of a software program refers to the process of converting an alternate copy to be the default copy. In one implementation, the switcher 108 promotes the selected copy of the software program by determining all the features of the selected copy, and ensuring that each feature exhibits a default interface on the computer system—i.e., each feature of the software program exhibits well defined behavior that causes the software program to appear as the default copy of the computer system. In one implementation, the features of a given software program are associated with inputs and outputs of the given software. The method 200 then proceeds to step 208 where the user (or another computer program) interacts with the selected software program as the default copy. The method 200 returns to step 202 should the user (or another computer program) decide to interact with a different copy of the software program.

Figure 3:
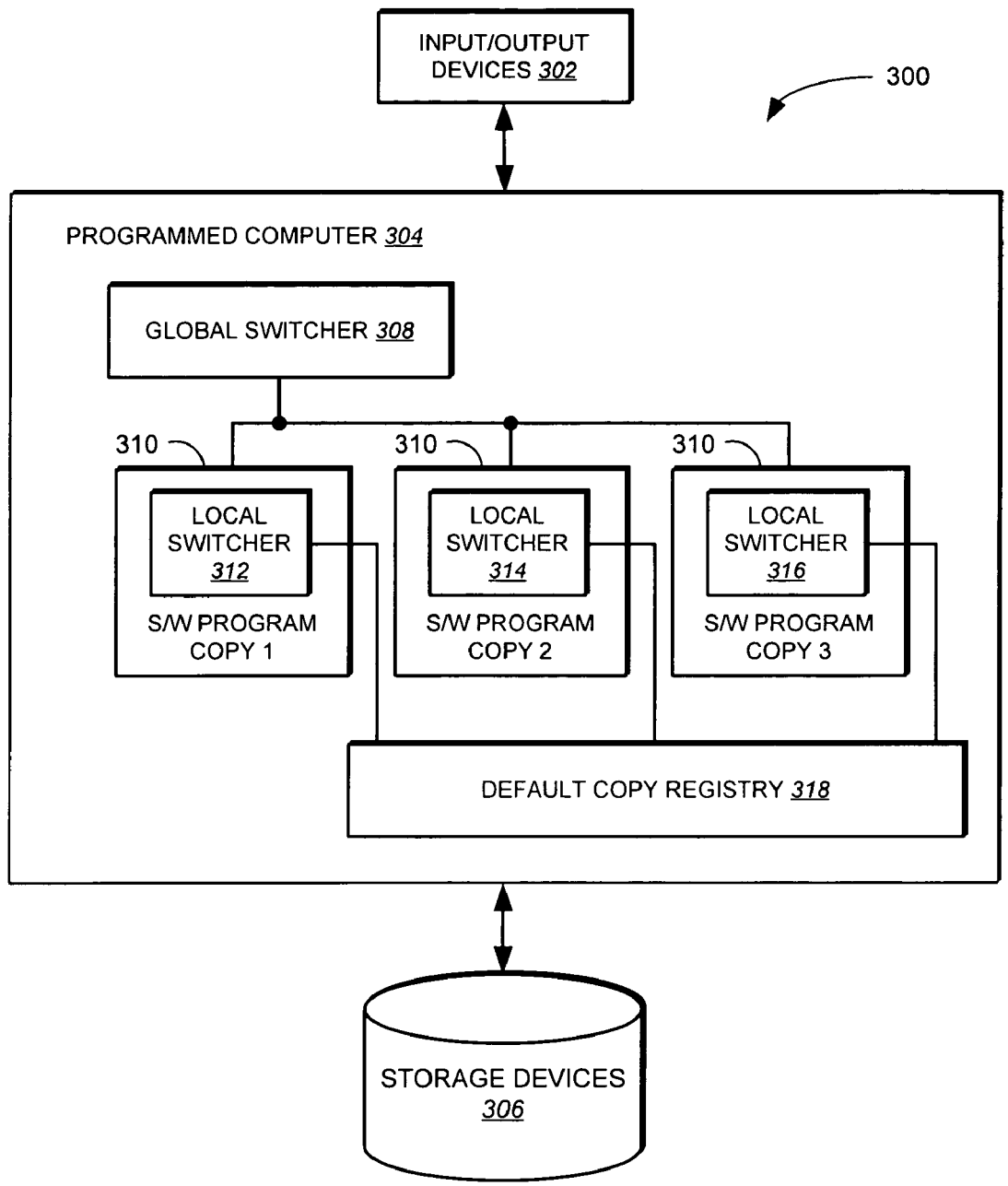
FIG. 3 is a block diagram of a system for switching between multiple versions of software program in accordance with one implementation of the invention.

FIG. 3 illustrates a system 300 for switching between multiple copies (or versions) of software program in accordance with one implementation of the invention. The system 300 includes input and output devices 302, a programmed computer 304, and storage devices 306. Running on the programmed computer 304 is a global switcher 308 and a software program 310. Also running on programmed computer 304 are local switchers 312-316 that are respectively associated with each of the three copies of the software program 310. Although three copies (or versions) of the software program 310 are shown in FIG. 3 by way of example, a different number of copies of the software program 310 may operate on the programmed computer 304 (separate and independent of the local switchers 312-316). In one implementation, the local switchers 312-316 are processes that are maintained independent of the executable file that activates the corresponding copy of the software program.

In operation, the global switcher 308 detects the various copies of a software program on a computer system—e.g., software program copies 1-3 of the software program 310. In one implementation, the global switcher 308 further receives user input selecting one of the detected copies to be a default copy. As discussed above, a default copy is a single copy of a given software program on a computer system that functions and/or presents itself as the only copy on the computer system, e.g., when the copy is being used by a user (or another computer program) that is either interested in or capable of interacting with only a single copy of a software program at any given point in time. Alternatively, the global switcher 308 can receive input from a computer program selecting a copy to be the default copy. If the selected copy is not the current default copy, then the global switcher 308 calls on the local switcher associated with the current default copy, which local switcher demotes the current default copy. The global switcher 308 also calls on the local switcher associated with selected copy (or alternate copy), which local switcher promotes the selected copy to be the new default copy. In one implementation, each local switcher (e.g., local switchers 312-316) demotes a corresponding copy of the software program 310 by unregistering the corresponding copy from a default copy registry 318 (e.g., a Windows registry). Likewise, in this implementation, each local switcher promotes a corresponding copy of the software program 310 by registering the corresponding copy in the default copy registry 318 (as the default copy). In this implementation, in which the local switcher promotes and demotes a corresponding copy of a given software program (independent of the global switcher 308), any software code associated with, or being part of, the global switcher 208 need not be updated as more versions of a software program become available. The global switcher 208 needs only to call the local switchers associated with the relevant versions of the software program to demote and promote the corresponding copy of the software program. In one variation, the local switcher for the new version is created; in another variation, the association between one local switcher with a pre-existing version may be replaced an association with the new version.

One or more of method steps described above can be performed by one or more programmable processors executing a computer program to perform functions by operating on input data and generating output. Generally, the invention can take the form of an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Figure 4:
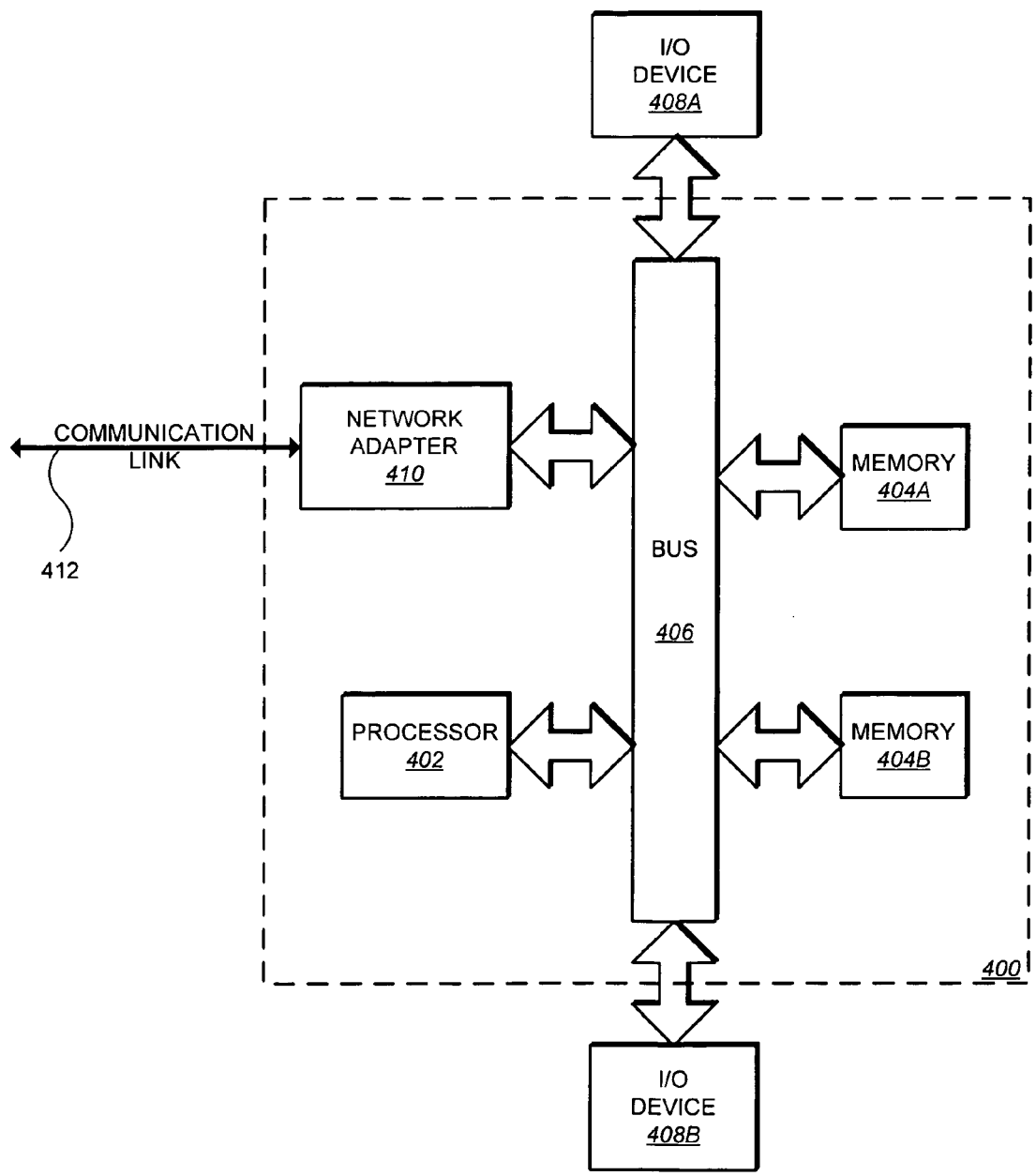
FIG. 4 is a block diagram of a computer system suitable for storing and/or executing program code in accordance with one implementation of the invention.

FIG. 4 illustrates a computer system 400 suitable for storing and/or executing program code. The computer system 400 includes a processor 402 coupled to memory elements 404A-B through a system bus 406. In other embodiments, the computer system 400 may include more than one processor and each processor may be coupled directly or indirectly to one or more memory elements through a system bus.

The memory elements 404A-B can include local memory employed during actual execution of the program code, bulk storage, and cache memories that provide temporary storage of at least some program code in order to reduce the number of times the code must be retrieved from bulk storage during execution. As shown, input/output or I/O devices 408A-B (including, but not limited to, keyboards, displays, pointing devices, and so on) are coupled to the computer system 400. The I/O devices 408A-B may be coupled to the computer system 400 directly or indirectly through intervening I/O controllers (not shown).

In the embodiment, a network adapter 410 is coupled to the computer system 400 to enable the computer system 400 to become coupled to other data processing systems (or computer systems) or remote printers or storage devices through a communication link 412. The communication link 412 can be a private or public network. Modems, cable modems, and Ethernet cards are just a few of the currently available types of network adapters.

Various implementations for switching between multiple copies (or versions) of software program on a computer system have been described. Nevertheless, one or ordinary skill in the art will readily recognize that there that various modifications may be made to the implementations, and any variation would be within the scope of the present invention. For example, the steps of methods discussed above can be performed in a different order to achieve desirable results. Accordingly, many modifications may be made by one of ordinary skill in the art without departing from the spirit and scope of the following claims.

What is claimed is:

1. A method for switching between multiple copies of a software program on a computer system, the method comprising:
    detecting a plurality of copies of the software program on a computer system;
    receiving input selecting one of the detected plurality of copies of the software program to be a default copy on the computer system, wherein each copy of the software program in the plurality of copies of the software program is a different version of a same software program, and wherein each of the plurality of copies of the software program are registered with a registry of the computer system such that at a same time each of the copies of the software program is separately identified in the registry of the computer system; and
    determining whether the selected copy of the software program is a current default copy on the computer system, wherein if the selected copy of the software program is not the current default copy on the computer system then:
        demoting the current default copy to be an alternate copy;
        determining one or more features of the current default copy;
        ensuring that each of the one or more features no longer exhibits a default interface on the computer system such that only one copy of the software program is operable at any given point in time and other copies, in the plurality of copies of the software program are hidden from users; and
        promoting the selected copy of the software program to be a next current default copy, wherein the default copy is a single copy of the software program that presents itself to a user or another computer program as the only copy of the software program on the computer system at any given time.

2. The method of claim 1, wherein detecting a plurality of copies of the software program comprises looking up a number of versions of the software program that are registered within the registry, wherein each version of the software program corresponds to a copy of the software program.

3. The method of claim 1, wherein receiving input selecting one of the detected plurality of copies of the software program includes receiving user input selecting one of the detected plurality of copies of the software program.

4. The method of claim 1, wherein promoting the selected copy of the software program includes determining one or more features of the selected copy of the software program, and ensuring that each of the one or more features exhibits a default interface on the computer system.

5. The method of claim 4, wherein demoting the current default copy further includes unregistering the current default copy from a registry, and promoting the selected copy of the software program further includes registering the selected copy of the software program in the registry.

6. A computer program product, comprising a computer-readable medium including instructions, for switching between multiple copies of a software program on a computer system, the instructions when executed on a programmable processor cause the programmable processor to:

detect a plurality of copies of the software program on a computer system;

receive input selecting one of the detected plurality of copies of the software program to be a default copy on the computer system, wherein each copy of the software program in the plurality of copies of the software program is a different version of a same software program, and wherein each of the plurality of copies of the software program are registered with a registry of the computer system such that at a same time each of the copies of the software program is separately identified in the registry of the computer system; and determine whether the selected copy of the software program is a current default copy on the computer system, wherein if the selected copy of the software program is not the current default copy on the computer system then the product further comprises instructions to:

demote the current default copy to be an alternate copy;

determine one or more features of the current default copy;

ensure that each of the one or more features no longer exhibits a default interface on the computer system such that only one copy of the software program is operable at any given point in time and other copies, in the plurality of copies of the software program are hidden from users; and promote the selected copy of the software program to be a next current default copy, wherein the default copy is a single copy of the software application that presents itself to a user or another computer program as the only copy of the software program on the computer system at any given time.

7. The computer program product of claim 6, wherein the instructions to detect a plurality of copies of the software program include instructions to look up a number of versions of the software program that are registered within the registry, wherein each version of the software program corresponds to a copy of the software program.

8. The computer program product of claim 6, wherein the instructions to receive input selecting one of the detected plurality of copies of the software program include instructions to receive user input selecting one of the detected plurality of copies of the software program.

9. The computer program product of claim 6, wherein the instructions to promote the selected copy of the software program include instructions to determine one or more features of the selected copy of the software program, and ensure that each of the one or more features exhibits a default interface on the computer system.

10. The computer program product of claim 9, wherein the instructions to demote the current default copy further include instructions to unregister the current default copy from a registry, and the instructions to promote the selected copy of the software program further include instructions to register the selected copy of the software program in the registry.

11. A system for switching between multiple copies of a software program on a computer system, the system comprising:

a global switcher detecting a plurality of copies of the software program on a computer system, receiving input selecting one of the detected plurality of copies of the software program to be a default copy, and determining whether the selected copy of the software program is a current default copy on the computer system, wherein if the selected copy of the software program is not the current default copy on the computer system then the system further comprises:

a first local switcher demoting the current default copy to be an alternate copy, the first local switcher being associated with the current default copy; and a second local switcher promoting the selected copy of the software program to be a next current default copy, the second local switcher being associated with the selected copy of the software program, wherein:

each copy of the software program in the plurality of copies of the software program is a different version of a same software program, each of the plurality of copies of the software program are registered with a registry of the computer system such that at a same time each of the copies of the software program is separately identified in the registry of the computer system, the default copy is a single copy of the software application that presents itself to a user or other software program as the only copy of the software program on the computer system at any given time, and demoting the current default copy includes determining one or more features of the current default copy, and ensuring that each of the one or more features no longer exhibits a default interface on the system such that only one copy of the software program is operable at any given point in time and other copies, in the plurality of copies of the software program are hidden from users.

12. The system of claim 11, wherein the global switcher is operable to receive user input selecting one of the detected plurality of copies of the software program to be a default copy through a user interface, and each local switcher is responsible for promoting and demoting a corresponding copy of the software program independent of the global switcher.

13. The system of claim 11, wherein each of the plurality of copies of the software program represents a different version of the software program.

\* \* \* \* \*